United States Patent
Lu et al.

(10) Patent No.: US 9,009,708 B2
(45) Date of Patent: Apr. 14, 2015

(54) METHOD AND SYSTEM TO EFFECTUATE RECOVERY FOR DYNAMIC WORKFLOWS

(75) Inventors: Ruopeng Lu, Calamvale (AU); Marek Kowalkiewicz, Moggill (AU); Bernd Schaeufele, Duernau (DE); Marita Kruempelmann, Dielheim (DE); Stefan Baeuerle, Rauenberg (DE)

(73) Assignee: SAP SE, Walldorf (DE)

( * ) Notice: Subject to any disclaimer, the term of this patent is extended or adjusted under 35 U.S.C. 154(b) by 717 days.

(21) Appl. No.: 12/751,553

(22) Filed: Mar. 31, 2010

(65) Prior Publication Data

US 2011/0246991 A1   Oct. 6, 2011

(51) Int. Cl.
*G06F 9/46* (2006.01)
*G06Q 10/06* (2012.01)

(52) U.S. Cl.
CPC ....................................... *G06Q 10/06* (2013.01)

(58) Field of Classification Search
None
See application file for complete search history.

(56) References Cited

U.S. PATENT DOCUMENTS

| | | | | |
|---|---|---|---|---|
| 2004/0054643 | A1* | 3/2004 | Vemuri et al. | 707/1 |
| 2004/0194107 | A1* | 9/2004 | Masuoka | 718/100 |

OTHER PUBLICATIONS

"European Application Serial No. 11001801.7, Communication Pursuant to Article 94(3) mailed Aug. 13, 2012", 8 pgs.
"Publications of the Business Process Technology Group", [Online]. Retrieved from the Internet: <URL: http://web.archive.org/web/20090301220714/http:l/bpt.hpi.uni-potsdam.de/Public/BptPublications,, (Mar. 1, 2009), 8 pgs.
"Publications of the Business Process Technology Group", [Online]. Retrieved from the Internet: <URL: http://web.archive.org/ web/20100212045254/http:/lbpt.hpi.uni-potsdam.de/Public/BptPublications>, (Feb. 12, 2010), 10 pgs.
Decker, G, et al., "Re-evaluation of Business Processes", BPT Technical Report, [Online]. Retrieved from the Internet: <URL: http://bpt.hpi.uni-potsdam.de/pub/Public/BptPublications/reevaluation.pdf>, (Jan. 2009), 1-14.
Decker, Gero, "Re: Patentprufungsverfahren (E-Mail)", Co-founder and CEO at Signavio, (Jun. 6, 2012), 1 pg.
Maschke, Philipp, "Execution and Re-evaluation of BPMN Processes", Bachelot's Theses HPI Universitaet Potsdam, [Online]. Retrieved from the Internet: <URL: http://bpt.hpi.uni-potsdam.de/pub/Public/ BptPublications/Bachelorarbeit_PhilippMaschke.pdf>, (Jun. 2008), 1-44.
Van Der Aalst, W M P, et al., "Case Handling: A New Paradign for Business Process Support", Data & Knowledge Engineering 53(2), (May 2005), 129-162.
"European Application Serial No. 11001801.7, Summons to Attend Oral Proceedings mailed Feb. 8, 2013", 7 pgs.
Wasserman, Bruno, et al., "Sedna: A BPEL-Based Environment for Visual Scientific Workflow Modeling", Workflows for eScience—Scientific Workflows for Grids, [Online]. Retrieved from the Internet: (2007), 22 pgs.

\* cited by examiner

*Primary Examiner* — Mengyao Zhe
(74) *Attorney, Agent, or Firm* — Schwegman Lundberg & Woessner, P.A.

(57) ABSTRACT

A computer-implemented smart recovery system for dynamic workflows addresses a change to a data object during execution of an instance of a workflow by selectively re-executing workflow tasks that are affected by the change, without cancelling the instance and restarting a new instance of the workflow. A determination of whether a task is to be re-executed during the smart recovery process may include examining a re-evaluation label assigned to the task.

18 Claims, 6 Drawing Sheets

METHOD AND SYSTEM TO EFFECTUATE RECOVERY FOR DYNAMIC WORKFLOWS

This disclosure relates generally to the field of business process management and particularly to smart recovery for dynamic workflows.

BACKGROUND

Business process models play an important role in facilitating the understanding of how companies operate and in providing a blueprint for software systems supporting these processes. The automation of a business process, during which documents, information, or tasks are passed from one participant to another for action according to a set of procedural rules, may be termed a workflow. A workflow may be expressed by a workflow model (also referred to as a process model). Workflow models may be generated using a graphical process modeling language. Typically, graphical process modeling languages allow for expressing control-flows, or ordering dependencies among tasks, in a process. Executing a process based on a workflow model and specific input data may be referred to as executing an instance of a workflow. When an instance of a workflow has completed executing or is cancelled, another instance of the workflow may be started, e.g., with new input data.

In large organizations, many tasks, such as those related to expenses, need to be approved before they are performed. For instance, a purchase order may need to be approved by several roles, depending on the value and the type of the items listed in the purchase order, and on the ordering agent's position in the organization's hierarchy. A purchase approval process may be expressed by a workflow model (e.g., titled a purchase workflow model). A computerized purchase approval process based on the purchase workflow model may be termed a purchase approval workflow. Each time a new purchase order needs to be processed, a new instance of the purchase approval workflow may be started.

As a purchase approval process may be more or less complex, the nature of business may require changes to a purchase order before an instance of the purchase approval workflow has completed execution. Currently it is not a common practice to enable changes to application data during workflow execution. The typical solution offered in such cases is to cancel the instance of the workflow and execute a new instance with the updated data.

BRIEF DESCRIPTION OF DRAWINGS

Embodiments are illustrated by way of example and not limitation in the figures of the accompanying drawings, in which like references indicate similar elements and in which.

DETAILED DESCRIPTION

A computer-implemented smart recovery system for dynamic workflows, in one example embodiment, addresses an unexpected change to a data object during execution of an instance of a workflow (by one or more processors) by re-executing workflow tasks that are affected by the change, without cancelling the instance and restarting a new instance of the workflow. An instance of a workflow may also be termed a workflow instance. Operations performed by a workflow application in response to an unexpected change to a data object during the execution of an instance of a workflow may be termed re-evaluation process or smart recovery process. A determination of whether a task is affected by the change to the data object is made based on the location of the task in the sequence of tasks associated with the workflow, as well as based on the characteristics of the task and other factors such as, for example, data dependency with respect to the task and any specific rules defined for the task. This approach may result in improving the overall performance of a workflow process and in reducing resource consumption associated with the workflow process.

In one example embodiment, a smart recovery system for dynamic workflows, where not all instances necessarily follow exactly the pre-defined execution routines, uses workflow models where each task is tagged with a so-called re-evaluation label. A re-evaluation label may be used at runtime by a workflow engine to determine whether the task needs to be re-executed when, due to unexpected changes to one or more data objects, the workflow instance has to be rolled back to a state where none of the executed workflow tasks are dependent on changed data object. A re-evaluation label may indicate, for example, that the task should only be executed once (e.g., when the task is never affected by any data objects manipulated by the workflow). A task that, for example, reads input data from another task and then provides output data to a further task may be tagged with a re-evaluation label indicating that the task should always be re-executed whenever an instance of the workflow is rolled back due to a change to a data object. Re-evaluation labels may be applied to tasks of a workflow model at design time and processed during runtime when smart recovery process is triggered (e.g., in response to detecting that an attribute of a data object associated with a workflow changes while the workflow instance is executing. For the purposes of this description the three types of labels will be identified as follows: "1 (Once)" indicating that the task is to be executed once, "∞ (Always)" indicating that the task should always be re-executed during smart recovery process, and "R (Rule based)" indicating that additional conditions need to be evaluated before it can be determined whether the task should be re-executed.

Figure 1:
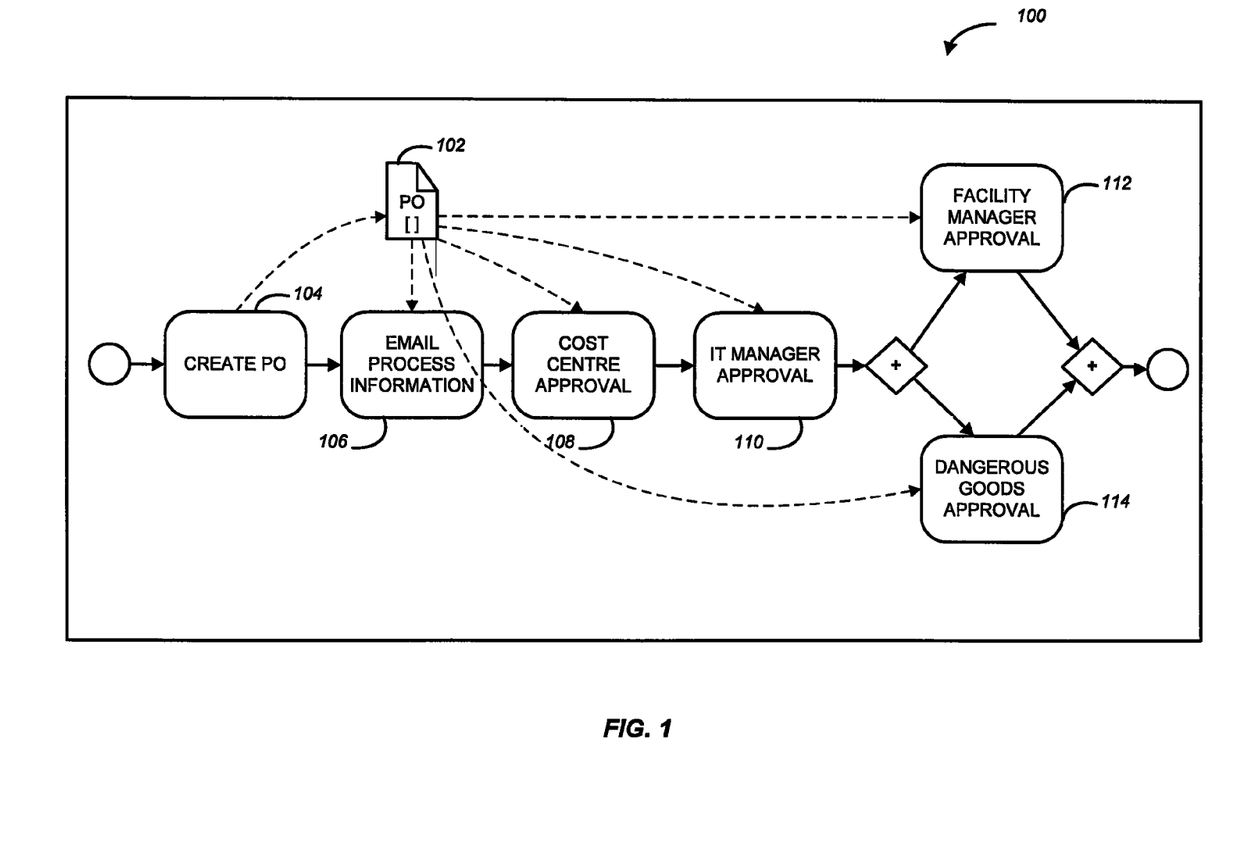
FIG. 1 is a diagrammatic representation of a workflow model, in accordance with an example embodiment.

Smart recovery process may be illustrated using an example of a dynamic purchase approval process. A diagrammatic representation of an approval workflow is illustrated in FIG. 1. The approval workflow is triggered when a project member creates a purchase request that involves a data object "Purchase Order" that is associated with a value that reflects the price of the items in the Purchase Order. Information present associated with the Purchase Order is provided in a form of a purchase request "PO" shown in FIG. 1 (block 102). According to the instance-specific conditions, (e.g., the price reflected in the purchase request), the purchase request is to be processed by several approval tasks, including "Cost Centre Approval" (block 108), "IT Manager Approval" (block 110), "Facility Manager Approval" (block 112), and "Dangerous Good Approval" (block 114). The value associated with the virtual Purchase Order can be changed at any time due to various reasons, and at some arbitrary time during the course of the workflow execution. For example, the number of the order items may change, the type of items may need to be updated, or the change of the item cost from catalogue has to propagate to the current purchase requests.

When a change to the "PO" data object (block 102) occurs while the approval workflow is executing, the following basic questions may arise during the abovementioned changes on the workflow instance. First, it is determined whether the change to the data object is allowed at this stage in the workflow process. In this example, the "Create PO" task (block 104) is changing the state of the external world, being part of a choreography with an external party. Re-executing the activity, or in other words overwriting an already submitted order, requires proper ability to react by the other party. In this case, the answer depends on specific conditions of the choreography partner. There are however cases where the change to the data object is not allowed, for example when a real world item is destroyed and it is not possible to recreate it and thus the associated workflow has to be cancelled.

Once it is determined that the change to the data object is allowed at this stage in the workflow process next inquiry is how far should the workflow instance be rolled back. The process should be rolled back to the first task in the process model that is affected by the data object being changed (the earliest affected task). In the example shown in FIG. 1 the first task in the process model that is affected by the data object being changed is "E-mail Process Information" (block 106). This state of the workflow instance may be termed a rolled-back state, and the tasks that occur in the sequence of tasks in the workflow model starting with the first task in the process model that is affected by the data object being changed may be termed rolled-back tasks. From that point the decisions with respect to whether any given task is to be re-executing need to be made. There is no need to roll back to the very beginning of the workflow instance. On the other hand, if the smart recovery process determines that there is an irrevocable task executed at any time between the earliest affected task and the state of the process at the time a change to a data object was detected, the smart recovery process is terminated, which may mean that the workflow instance needs to be terminated.

In one example embodiment, in order to determine whether to re-execute a task, the smart recovery process analyzes the re-evaluation label associated with the task. As mentioned above, a re-evaluation label may indicate one of the three types of activities: execute once, always re-execute, and execute conditionally. Execute once label indicates that the task should be executed only once during workflow instance execution. Always re-execute label indicates that the task should be executed every time: during normal execution, as well as during the smart recovery process. Execute conditionally label indicates that the task is to be re-executed depending on a specified condition. Example smart recovery system may be implemented in the context of a network environment illustrated in FIG. 2.

Figure 2:
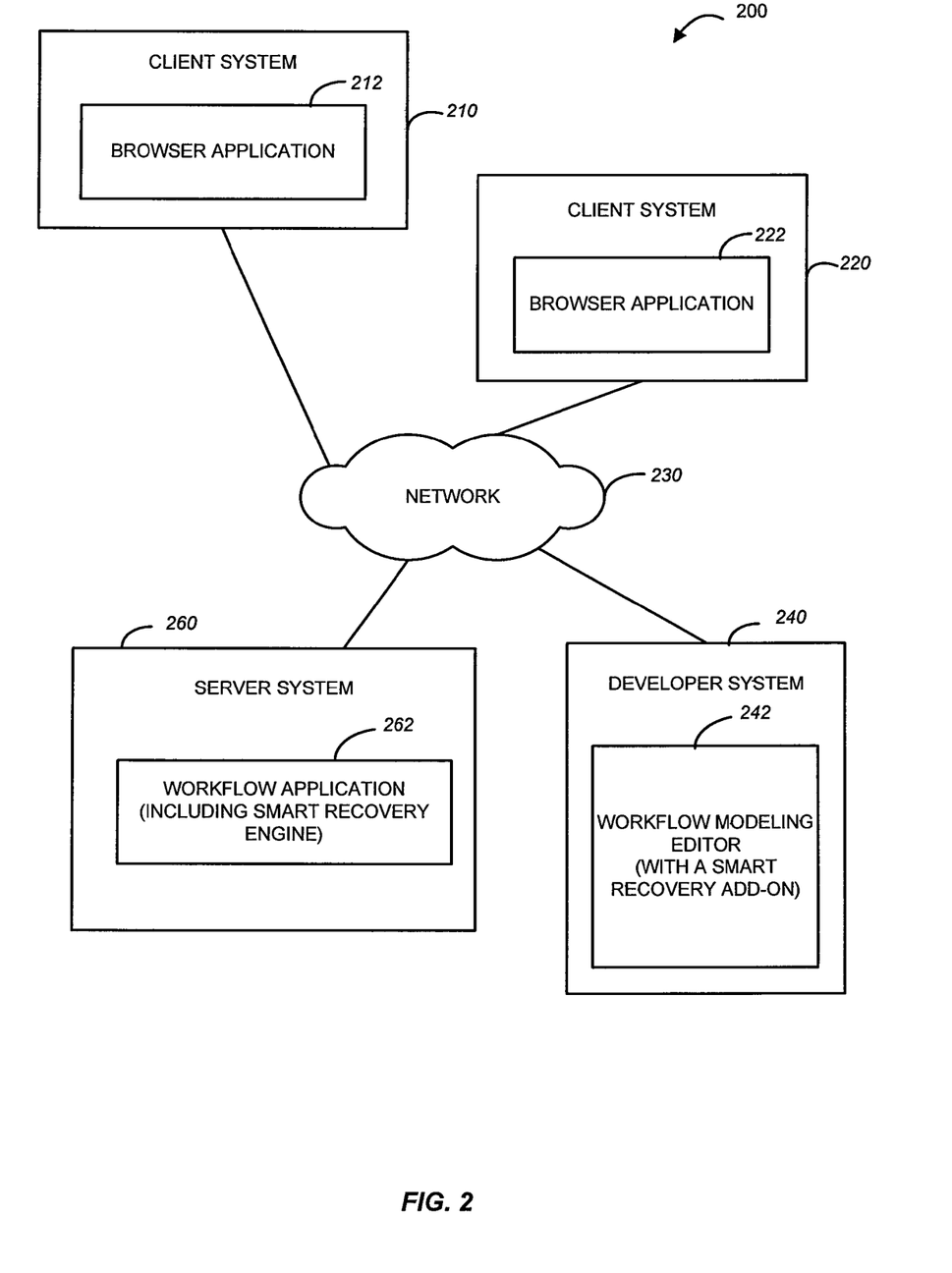
FIG. 2 is a block diagram showing a network environment within which method and system for effectuating smart recovery for dynamic workflows may be implemented, in accordance with an example embodiment.

FIG. 2 shows an example network environment 200, within which method and system for effectuating smart recovery for dynamic workflows may be implemented. The network environment 200 may include client computer systems 210 and 220 and a server computer system 260. The client systems 210 and 220, and the server system 260 may be in communications with each other via a network 230. The communications network 230 may be a public network (e.g., the Internet, a wireless network, a public switched telephone network (PSTN), etc.) or a private network (e.g., LAN, WAN, Intranet, etc.). The server system 260 may host a workflow application 262. The workflow application 262 is configured to execute workflow instances and to perform smart recovery when an unexpected change is detected in a data object during the execution of an instance of a workflow.

Also shown in FIG. 2 is a developer computer system 240. The developer system 240 may host a workflow modeling editor 242 (also referred as a workflow editor). In one embodiment, the workflow modeling editor 242 is provided with a smart recovery module configured to provide re-evaluation labels and rules, validation of the label assignment to tasks, and auto-completion functionality. The workflow modeling editor 242 may be used to generate workflow models comprising a plurality of tasks, where each task has been associated with a re-evaluation label. When the workflow application 262 executes a workflow instance associated with a model generated with the use of the workflow modeling editor 242, smart recovery process may be triggered in response to detecting a re-evaluation triggering event (e.g., an unexpected change to a data object associate with the workflow instance).

A smart recovery approach, thus, may rely on design time support in the form of the workflow modeling editor 242 that includes with a smart recovery module capable of associating tasks with re-evaluation labels and on runtime support in the form of a workflow application 262 provided with a workflow engine capable of performing smart recovery utilizing re-evaluation labels. A diagrammatic representation of architecture for supporting smart recovery approach is shown in FIG. 3.

Figure 3:
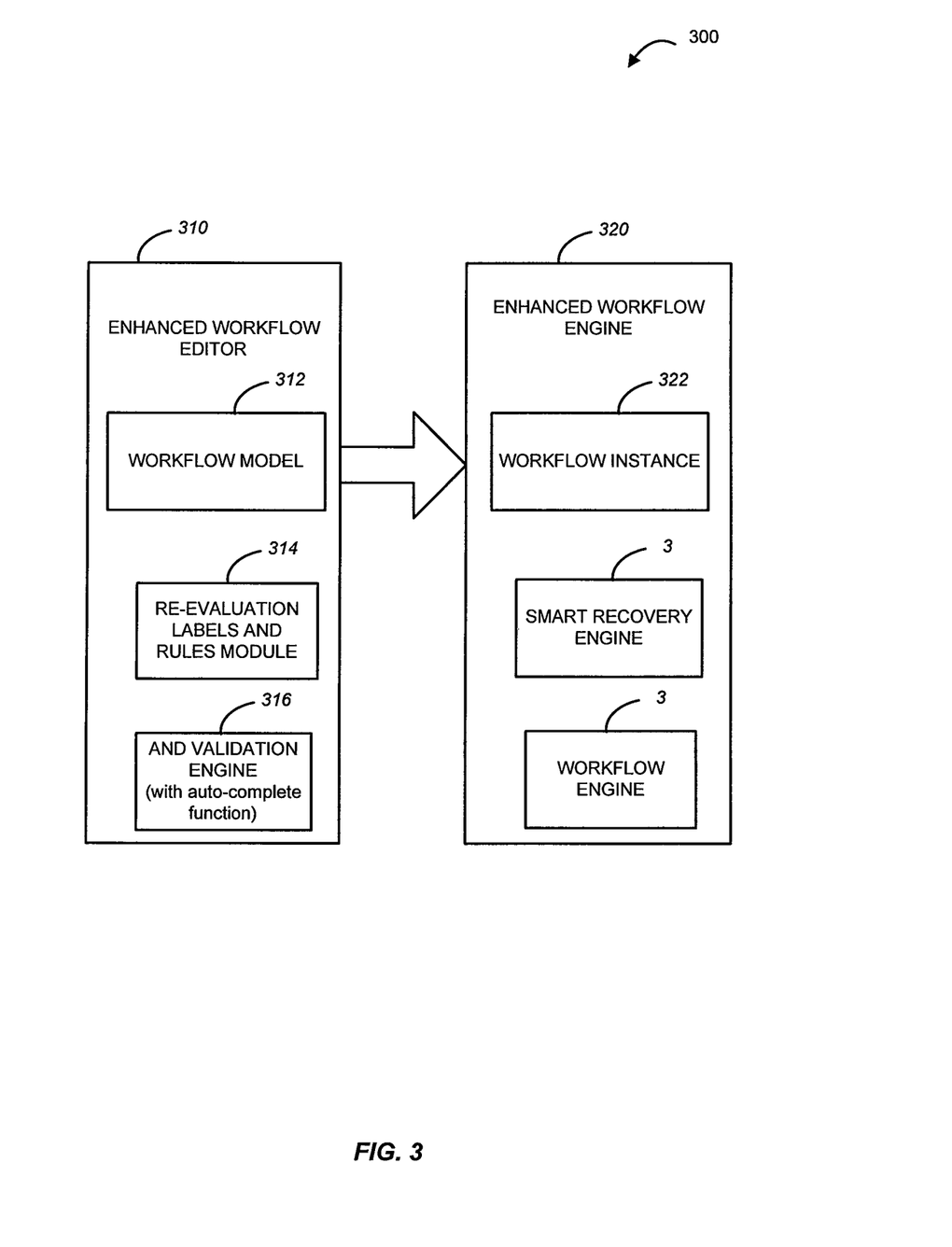
FIG. 3 is a block diagram illustrating an example architecture for supporting smart recovery approach.

Shown in FIG. 3 is an enhanced workflow editor that may be used to generate a workflow model 312. The workflow model may be used by an enhanced workflow engine 320 to execute a workflow instance 322. The workflow model 312 is generated using a re-evaluation labels and rules module 314 and a validation engine 316. The re-evaluation labels and rules module 314 and the validation engine 316 may be collectively termed a smart recovery module. The enhanced workflow engine 320 comprises a smart recovery engine 324 that is utilized when a workflow instance needs to be rolled-back due to a change to a data object associated with the workflow instance.

As explained above, in one example embodiment, a workflow model is generated in a way that each task present in the workflow model is associated with a re-evaluation label that defines a re-evaluation option. Alternatively, unlabeled tasks may be treated as associated with a default label or a pre-determined re-evaluation action. A re-evaluation label may be provided as an additional property of a workflow task. Re-evaluation labels specify whether the task should be re-executed or skipped during smart recovery process. When a user who is designing a workflow model (process modeler) specifies re-evaluation labels, the 316 validation engine is running to constantly check label designs, in order to prevent error situations such as lost update or redundant read. The validation engine 316 may be configured to also support an auto-completion function. The auto-completion function may be utilized beneficially where a process modeler only specifies the re-evaluation behaviors for a few key workflow tasks but does not necessarily specify re-evaluation behaviors for every task in the workflow model. The validation engine 316 may automatically determine appropriate re-evaluation labels for those tasks where re-evaluation behavior was not specified by the modeler of the workflow, by activating the auto-completion function. For example, if an unlabeled task reads data from a task that has the label indicating that the task should always be re-executed, the validation engine 316 would assigning this unlabeled task the label "∞ (Always)." A workflow model generated with the use of the enhanced workflow editor 310 may be stored in a repository for future use or it can also be provided directly to the enhanced workflow engine 320.

The enhanced workflow editor 310 may be provided at a developer computer system (e.g., the developer system 240 of FIG. 2), and the enhanced workflow engine 320 may be provided at a server computer system (e.g., the server system 260 of FIG. 2) that communicates with the developer computer system via a network.

Runtime support for smart recovery may be provided by the integration of a smart recovery engine in the workflow engine framework. At runtime, smart recovery is triggered by a re-evaluation event (such as a change to a data object attribute). A change to a data object attribute triggers smart recovery process. The smart recovery engine 324 may be configured to determine appropriate actions in response to a re-evaluation event based on pre-specified re-evaluation options (labels), execution state of the workflow instance, and data dependencies between workflow tasks associated with the workflow instance.

In one embodiment, smart recovery process may be performed in several phases. When smart recovery is triggered, the smart recovery engine examines current execution state of the workflow instance, and determines whether re-evaluation is possible. Execution state of the workflow instance may be associated with a certain task from the workflow instance that has just been performed or is ready to be performed. If it is determined that re-evaluation is possible, the rollback phase begins. Otherwise, the modification to the data object is rejected, which may trigger human intervention.

During the rolled-back phase, the workflow instance is rolled back to a state (rolled-back state) where none of the executed workflow tasks are dependent on the data object that triggered re-evaluation process. The roll-forward phase is similar to normal workflow execution, except that the processing of tasks commences with a task associated with the rolled-back state and the smart recovery engine analyses each next workflow task and notifies the workflow engine to re-execute the task or to skip its execution according to the re-evaluation label associated with the task, data dependencies, and execution states of the affected tasks.

As mentioned above, enhanced workflow editor permits a user to attach labels to tasks of a workflow model in order define behavior of the associated workflow during runtime. Referring to the example illustrated in FIG. 1, it may be necessary to re-execute the "Dangerous Goods Approval" task whenever there is a change to the data item associated with the "Purchase Order." The task "Email Process Information," on the other hand, should be executed only once if it is not necessary to resend the email associated with the purchase order. Some tasks in the approval workflow require more complex execution behavior. For instance, the "Cost Center Approval" task may be considered highly important, but also resource-intensive, because it may need to be executed by a supervising employee. Therefore, the "Cost Center Approval" task should not be re-executed every time, when an item of the purchase order is changed. It may be determined by the user who is designing the approval workflow model that this task should only be re-executed if certain conditions are met, e.g., if the value of the items in the Purchase Order has changed by a certain percentage.

As the re-evaluation labels are considered during re-execution at runtime, improperly assigned labels may lead to data anomalies, such as lost updates, e.g., when a task that reads data from another task is not re-executed with the new data. In order to safeguard against potential data anomalies, the enhanced workflow editor may be configured to provide validation and the auto completion functionality. The validation module may be configured to check the labels that are assigned to tasks to determine whether they can lead to data anomalies during run-time. The auto completion function may be configured to automatically label unlabeled tasks, based on the labels already assigned to other tasks.

In one example embodiment, the validation module determines, at design time, whether the labels are attached to the workflow tasks in a valid way, so that during run time no redundant read or lost update can occur. A lost update occurs, when a task that writes a data object is re-executed, while a reading task is not re-executed. A redundant read occurs when a task that reads a data object is re-executed, while the task that writes this data object is not re-executed. Example validation algorithm implemented in the validation module considers a number of schemas of data dependencies, as listed below.

1. Sequence: a first task writes data, which is read by a second task that follows the first task.
2. Transitive sequence: a first task writes data, which is read by a second task, which, in turn, writes data that is read by a third task.
3. Parallel input: a task reads data objects that are written by two or more different tasks.
4. Parallel output: a task writes data objects that are read by two or more different tasks.
5. Sub-workflow input: a task reads data that is written by a sub-workflow (e.g., an ad-hoc task).
6. Sub-workflow output: a task writes data that is read by a sub-workflow (e.g., an ad-hoc task).
7. Loop reading: a reading task is in a loop
8. Loop writing: a writing task is in a loop
9. Loop data transfer: the tasks that write and read a data object are both embedded in the same loop.

Example design time validation algorithm checks whether the assignment of labels is susceptible to the risk of lost updates or redundant reads during runtime. The validation module may be configured to examine all tasks in the workflow model. If a task that is the subject of such examination (subject task) has a label, it is compared to all tasks to which it is related to by an outgoing data dependency. The subject task is compared to all tasks in the workflow model that read data that is being written by the subject task. If the subject task contains a sub-workflow, each task within the sub-workflow is compared with the subject task. Sub-workflow containment is checked recursively, i.e., if a sub-workflow contains another sub-workflow, the tasks in the inner sub-workflow are checked as well. Moreover, if a task is contained within a sub-workflow, not only the outgoing data dependencies of the task itself are used for comparison, but also the data dependencies of the parent sub-workflows. The search for this data dependency works recursively; in addition, if the parent sub-workflow is contained in another sub-workflow, the data dependencies of the latter are used as well. Some examples of examination performed by the validation module are provided below.

If two tasks, a first task that writes data and a second task that reads data, are not within the same loop, a warning for redundant read is given, if the first task has the label "1 (Once)" or "R (Rule based)" and the second task has the label "∞ (Always)" or "R (Rule based)."

If two tasks, a first task that writes data and a second task that reads data, are embedded in the same loop, an error for lost update is triggered if the first task has the label "1 (Once)" and the second task has the label "∞ (Always)" or "R (Rule based)." An error is also triggered if the first task has the label "∞ (Always)" and the second task has the label "1 (Once)" or "R (Rule based)." An error is also triggered if the first task has the label or "R (Rule based)" and the second task has the label "1 (Once)" or "R (Rule based)."

If two tasks, a first task that writes data and a second task that reads data, are not within the same loop, an error is only triggered if the first task has one of the labels "∞ (Always)" or "R (Rule based)" and the second task has one of the labels "1 (Once)" or "R (Rule based)."

Figure 4:
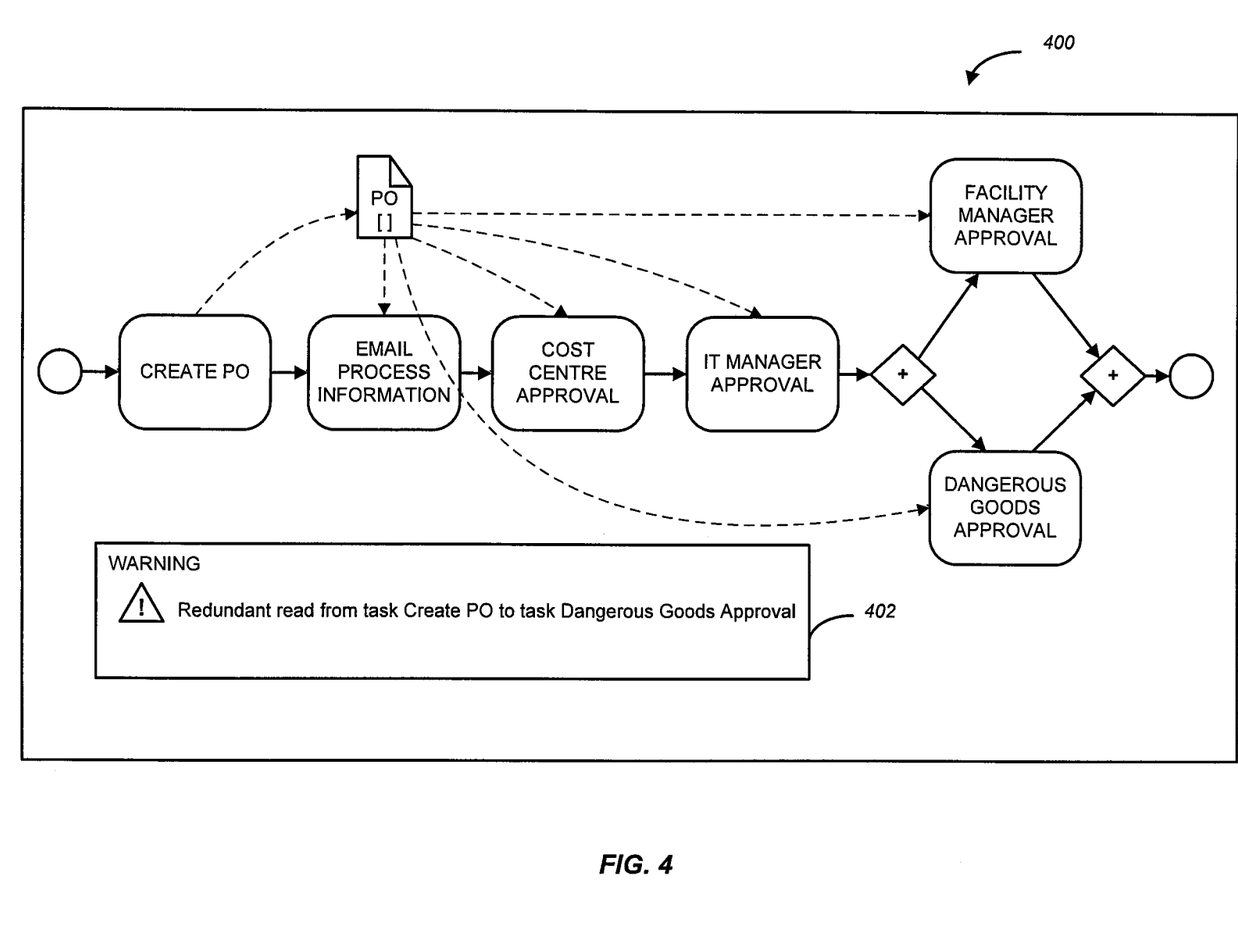
FIG. 4 is a diagrammatic representation of a workflow model having tasks tagged with re-evaluation labels, in accordance with an example embodiment.

In one example embodiment, the validation module may be implemented as a plug-in for an existing workflow editor. FIG. 4 is a diagrammatic representation of the dynamic approval process shown in FIG. 1, where the tasks have been assigned re-evaluation labels. Also shown in FIG. 4 is a pop-up warning window 402 presented in response to the validation module detecting potential redundant read by the task "IT Manager Approval."

Returning to FIG. 3, the auto completion function may be configured to assign appropriate labels to those tasks in a workflow model that have not had a label assigned. The auto completion function may assign a label to an unlabeled task based on re-evaluation labels of those tasks in the workflow model that have data dependency with respect to the unlabeled task (e.g., tasks that read data written by the unlabeled task and tasks that write data that is read by the unlabeled task). In operation, the auto completion function may first scan tasks within the workflow model and determine, for each task, whether it has a label already assigned. If a task is an unlabeled task, the auto completion function attempts to access labels of one or more tasks that provide data to the unlabeled task and also attempts to access labels of one or more tasks that read data from the unlabeled task. If the unlabeled task contains a sub-workflow, the contained tasks are also examined. All tasks that write data that is being read by the unlabeled task and read data written by the unlabeled task are evaluated. If one of the examined tasks has a label, this label is added to the list of possible labels. Otherwise, if a data predecessor or successor tasks are also unlabeled, the labels of their respective data predecessors and successors are retrieved recursively. All visited tasks are marked so that the marked tasks are not revisited by the algorithm. In one example embodiment, the auto completion function may be implemented as a plug-in for an existing workflow editor.

As explained above, the decision of whether a subject task should be re-executed may be made by the smart recovery engine based on several factors: first, the re-evaluation label is examined; next, data dependencies with respect to the subject task are considered as well. For example, if a task has the label "1 (Once)" and it reads data that is also read by another task that has the label "∞ (Always)," the task must be re-executed, so that two tasks have not been executed with different versions of data. Another factor that is being considered by the smart recovery engine is the point of execution that was reached at the time a change to a data object was detected. In one embodiment, a task may be considered to be in one of four different types of execution states. The execution states are listed below.

1. Initialized: the task is initialized, but not yet ready to be executed. A task gets this status when the process is started.
2. Activated: the task is enabled, i.e. ready to be executed, or is running.
3. Suspended: the task has been activated, but is temporarily interrupted.
4. Finished: the execution of the task is completed.

A task enters "Activated" state, when execution of all predecessor tasks has been completed and all input data objects are available. A task is suspended, when there is a temporary interruption, such as, e.g., resource unavailability. As soon as the reason for the suspension is no longer present, the task state returns to the "Activated" state. When execution of a task is terminated, the task is in the "Finished" state.

Activity states may influence re-execution decisions made by the smart recovery engine. For instance, if a task has been activated and has the label "1 (Once)", then the previous execution can be completed, whereas if the previous execution state has been "initialized," the task must be executed completely.

In one example embodiment, the workflow engine creates and maintains execution log for a workflow instance. Execution log contains a record of each task together with the tasks' respective input and output values. As soon as a task is enabled, an entry for this task is added to the execution log. The state of execution associated with the task is also added to the log entry. Furthermore, the causal dependency of the tasks may also be noted in the execution log. Thereby a partial order of the log entries is defined. The task executions that enabled the task are its predecessors in the execution log.

As discussed above, when a change to a data object is detected, the workflow engine commences smart recovery process. The workflow instance is rolled back to a state before the first task that reads this data object is executed. This can be determined by examining entries in the execution log. All entries in the execution log associated with tasks that have been rolled back (rolled-back tasks) are removed from the execution log and stored in an execution context. An execution context may be implemented as a list of tasks that have been executed prior to the change to the data object and may need to be re-executed. Subsequently, the execution context is used during smart recovery as described below.

If a task is to be executed with a certain data input, the smart recovery engine determines whether this task is already present in the execution context. If not, the task is executed normally. This behavior is also the normal execution logic before the process is rolled back.

If the task can be found in the execution context, the execution logic depends on whether the task has been only activated or finished. If the task is activated and the task reads data from another task that has the label "∞ Always" or "R (Rule based)" and the rule is evaluated to true or the task has been re-executed for another reason, the effects of the first execution are undone and the task is restarted. The same holds if an input data object of the task triggered smart recovery process. This is done to prevent conflicts that can arise if a task is continued from a previous execution but the input data of the task has been changed in the meantime.

If the task has been activated and has no data predecessor that has been re-executed, the behavior depends solely on the label of the task. If the task has the label "1 (Once)" or "R (Rule based)" with a rule that evaluates to false, the previous execution of the task is completed. If the task has the label "∞ (Always)" or "R (Rule based)" and the rule evaluates to true, the effects of the previous execution are undone and the task is restarted.

Special consideration may be taken, if the task has already been finished before the smart recovery process is commenced. If the label of the task is "∞ (Always)" or "R (Rule based)" and the rule is evaluated to true, the task is re-executed. The same holds if the task reads data that is written by a task that is re-executed and there is another task reading this data that is re-executed as well. The reason for that is that otherwise there might be tasks that have been executed with the old version of the data and tasks that have been executed with the new version of the data. In addition, if there is another instance of the task that has not yet reached the finished state, the task is re-executed for the same reason. In other cases, the task is simply skipped.

Figure 5:
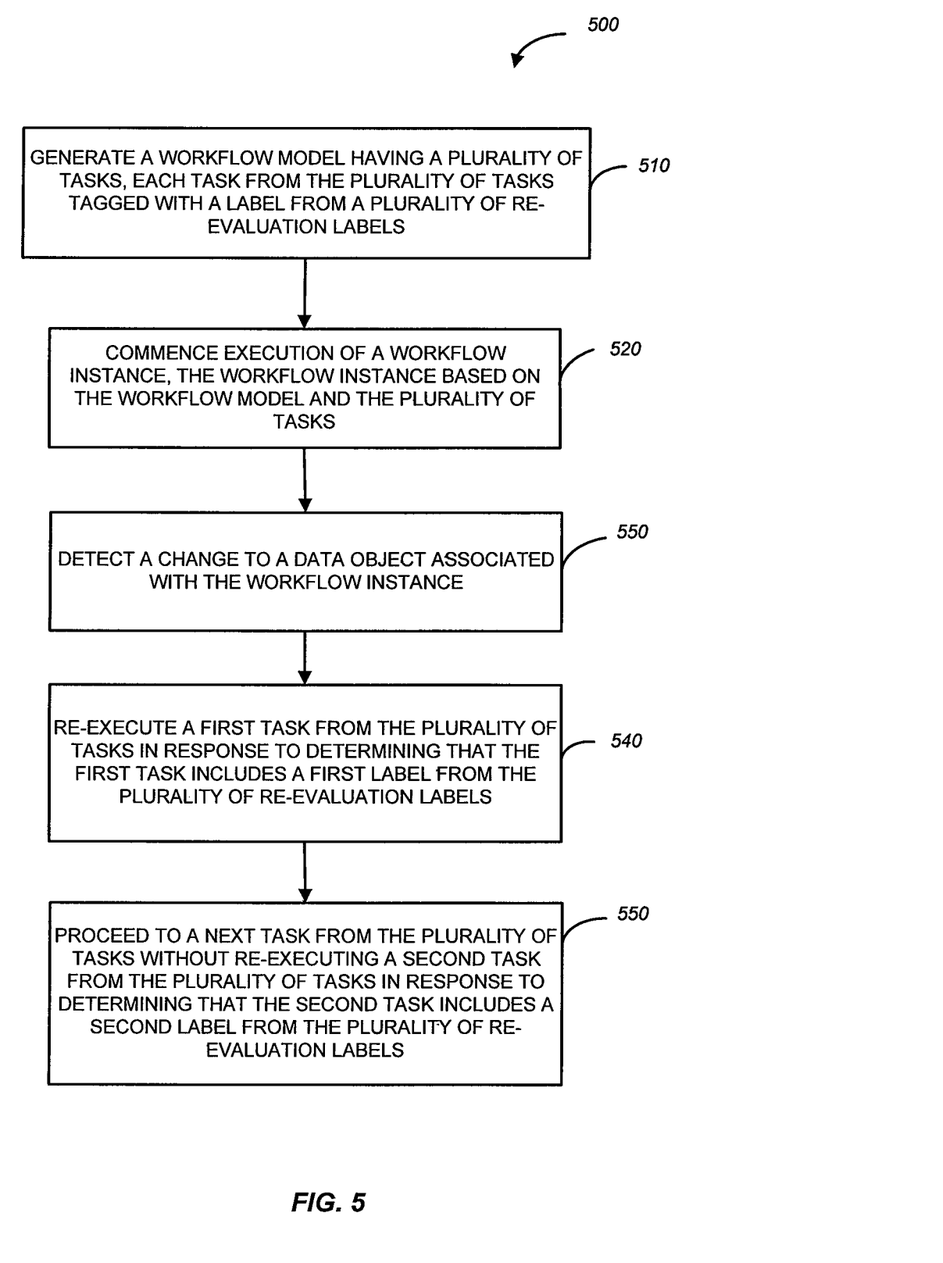
FIG. 5 is a is a flow chart illustrating a method for selectively re-executing rolled back tasks in response to detecting a change to a data object associated with the workflow instance, in accordance with an example embodiment.

FIG. 5 is a is a flow chart illustrating a method 500 for selectively re-executing rolled back tasks in response to detecting a change to a data object associated with the workflow instance. The method 500 may be performed by processing logic that may comprise hardware (e.g., dedicated logic, programmable logic, microcode, etc.), software (such as run on a general purpose computer system or a dedicated machine), or a combination of both. The processing logic, according to example embodiments, may reside in any of the modules shown in FIG. 3.

As shown in FIG. 5, the method 500 commences at operation 510, where the workflow editor 310 of FIG. 3 generates a workflow model having a plurality of tasks, each task from the plurality of tasks tagged with a label from a plurality of re-evaluation labels. At operation 520, the workflow engine 320 of FIG. 3 commences execution of a workflow instance associated with the workflow model. At operation 530, the workflow engine 320 detects a change to a data object. A first task from the plurality of tasks is re-executed if it is determined that the first task includes a first label from the plurality of re-evaluation labels (e.g., "∞ (Always)" (operation 540). A next task from the plurality of tasks is skipped rather than being re-executed if it is determined that the second task includes a second label from the plurality of re-evaluation labels e.g., "1 (Once)" (operation 550).

Figure 6:
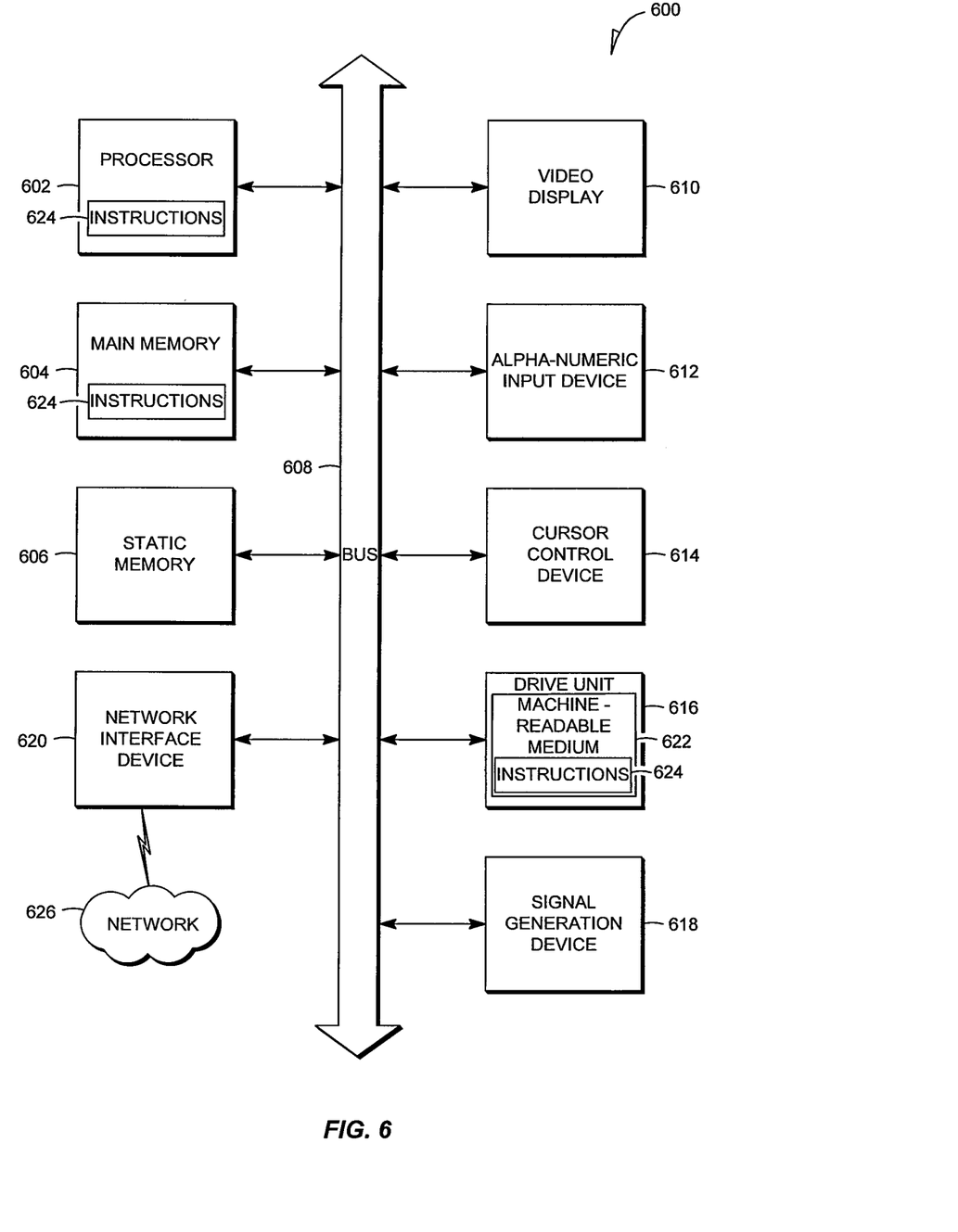
FIG. 6 is a diagrammatic representation of a machine in the example form of a computer system within which a set of instructions, for causing the machine to perform any one or more of the methodologies discussed herein, may be executed.

FIG. 6 is a diagrammatic representation of a machine in the example electronic form of a computer system 600 within which a set of instructions, for causing the machine to perform any one or more of the methodologies discussed herein, may be executed.

In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 66) embodying or utilized by any one or more of the methodologies or functions described herein. The software 66 may also reside, completely or at least partially, within the main memory 604 and/or within the processor 602 during execution thereof by the computer system 600, the main memory 604 and the processor 602 also constituting machine-readable media.

The software 66 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" may be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like. The term "machine-readable storage medium" shall be taken to exclude any medium that is capable of carrying a set of instructions (such as carrier waves).

The embodiments described herein may be implemented in an operating environment comprising software installed on a computer, in hardware, or in a combination of software and hardware.

Thus, method and system to effectuate recovery for dynamic workflows have been described. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A computer-implemented method comprising:
   accessing a workflow model having a plurality of tasks, each task from the plurality of tasks tagged with a label from a plurality of re-evaluation labels, the workflow model generated using a workflow modeling editor using a process modeling language;
   commencing execution of a workflow instance, the execution of the workflow instance based on the workflow model and specific input data;
   detecting a change to a data object associated with e specific input data of the workflow instance;
   re-executing a first task from the plurality of tasks in response to determining that the first task includes a first label from the plurality of re-evaluation labels, wherein the re-executing of the first task comprises determining that the first label indicates that the first task is to be executed once for the workflow instance and determining that the first task reads data that is also read by a task from the plurality of tasks that is designated as to always be re-executed when the workflow process is rolled-back; and using at least one processor, proceeding to a next task from the plurality of tasks while skipping re-executing of a second task from the plurality of tasks in response to determining that the second task includes a second label from the plurality of re-evaluation labels.

2. The method of claim 1, comprising generating of the workflow model, the generating of the workflow model comprising:

assigning a re-evaluation label to each task from the plurality of tasks; and validating, for each task from the plurality of tasks, an associated re-evaluation label.

3. The method of claim 2, wherein the generating of the workflow model comprises:

detecting an unlabeled task from the plurality of tasks;

determining a suitable label from the plurality of re-evaluation labels, the suitable label suitable for the unlabeled task; and assigning the suitable label to the unlabeled task.

4. The method of claim 1, wherein the re-executing of the first task is in response to evaluating dependencies of the first task with respect to other tasks in the workflow instance.

5. The method of claim 1, wherein the re-executing of the first task comprises:

determining execution state of the first task at the time of the change to the data object, and re-executing the first task base on the determined execution state of the first task.

6. The method of claim 1, further comprising:

in response to the detecting of the change to the data object, rolling back the workflow instance to a rolled-back state where none of the executed workflow tasks are dependent on the data object.

7. The method of claim 6, further comprising maintaining an execution log to record data associated with the plurality of tasks.

8. The method of claim 7, further comprising determining the rolled-back state based on information provided in the execution log.

9. The method of claim 7, further comprising:

removing from the execution log entries associated with rolled-back tasks from the plurality of tasks, the rolled-backed tasks having been executed subsequent to the rolled back state;

storing the removed rolled-back entries in an execution context; and analyzing the first label assigned to the first task in response to the determining that the execution context includes an entry associated with the first task.

10. A computer-implemented system comprising:

a workflow editor to, using at least one processor, generate a workflow model having a plurality of tasks, each task from the plurality of tasks tagged with a label from a plurality of re-evaluation labels, the workflow model generated using a workflow modeling editor using a process modeling language; and a workflow engine to, using at least one processor:

commence execution of a workflow instance the execution of the workflow instance based on the workflow model and specific input data, detect a change to a data object associated with the specific input data of the workflow instance, re-execute a first task from the plurality of tasks in response to determining that the first task includes a first label from the plurality of re-evaluation labels, and proceed to a next task from the plurality of tasks while skipping re-executing of a second task from the plurality of tasks in response to determining that the second task includes a second label from the plurality of re-evaluation labels, wherein the re-executing of the first task comprises determining that the first label indicates that the first task is to be executed once for the workflow instance and determining that the first task reads data that is also read by a task from the plurality of tasks that is designated as to always be re-executed when the workflow process is rolled-back.

11. The system of claim 10, wherein the workflow editor comprises a validation engine to validate, for each task from the plurality of tasks, an associated re-evaluation label.

12. The system of claim 10, wherein the workflow editor is to:

detect an unlabeled task from the plurality of tasks;

determine a suitable label from the plurality of re-evaluation labels, the suitable label suitable for the unlabeled task; and assign the suitable label to the unlabeled task.

13. The system of claim 10, wherein the workflow engine is to re-execute the first task is in response to evaluating dependencies of the first task with respect to other tasks in the workflow instance.

14. The system of claim 10, wherein the workflow engine is to:

determine execution state of the first task at the time of the change to the data object, and re-execute the first task based on the determined execution state of the first task.

15. The system of claim 10, wherein the workflow engine is to roll back the workflow instance to a rolled-back state where none of the executed workflow tasks are dependent on the data object, in response to the detecting of the change to the data object.

16. The system of claim 15, wherein the workflow engine is to maintain an execution log to record data associated with the plurality of tasks.

17. The system of claim 16, wherein the workflow engine is to determine the rolled-back state based on information provided in the execution log.

18. A machine-readable non-transitory storage medium having instruction data to cause a machine to:

access a workflow model having a plurality of tasks, each task from the plurality of tasks tagged with a label from a plurality of re-evaluation labels, the workflow model generated using a workflow modeling editor using a process modeling language;

commence execution of a workflow instance the execution of the workflow instance based on the workflow model and specific input data;

detect a change to a data object associated with the specific input data of the workflow instance;

re-execute a first task from the plurality of tasks in response to determining that the first task includes a first label from the plurality of re-evaluation labels, wherein the re-executing of the first task comprises determining that the first label indicates that the first task is to be executed once for the workflow instance and determining that the first task reads data that is also read by a task from the plurality of tasks that is designated as to always be re-executed when the workflow process is rolled-back; and proceed to a next task from the plurality of tasks while skipping re-executing of a second task from the plurality of tasks in response to determining that the second task includes a second label from the plurality of re-evaluation labels.

\* \* \* \* \*